F. Russell,
Bedstead Cording,
Nº 21,519. Patented Sep. 14, 1858.
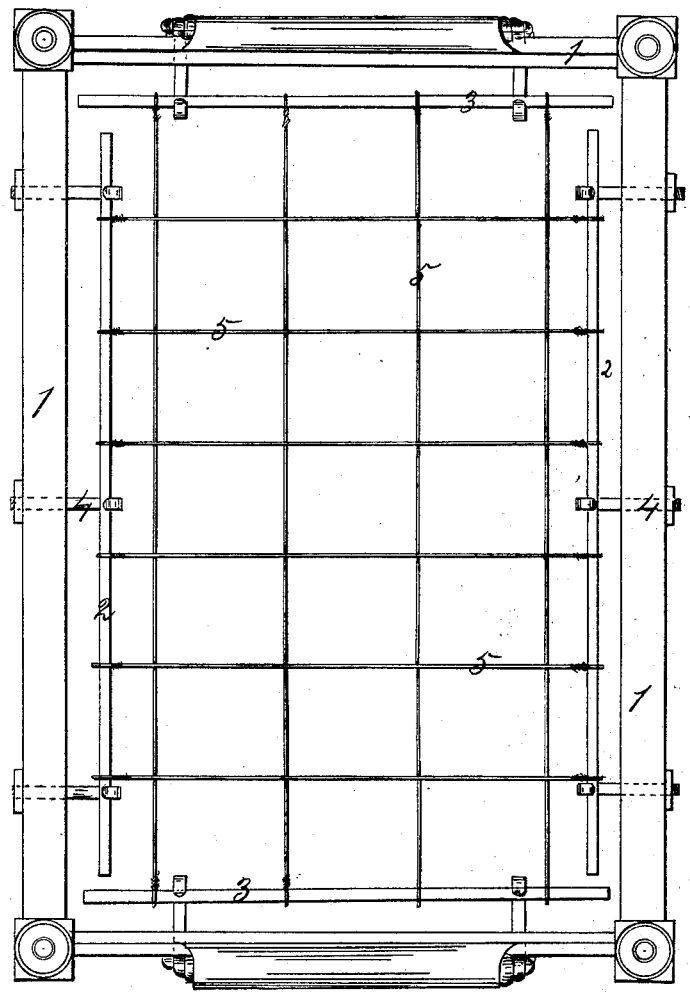

UNITED STATES PATENT OFFICE.

F. RUSSELL, OF OTSELIC, NEW YORK.

BED-BOTTOM.

Specification of Letters Patent No. 21,519, dated September 14, 1858.

*To all whom it may concern:*

Be it known that I, FRANKLIN RUSSELL, of the town of Otselic, in the county of Chenango and State of New York, have invented a new and Improved Mode of Cording Bedsteads; and I do hereby declare that the following is a full and exact description thereof, reference being had to the drawing of the same.

Instead of cords made of flax or any other vegetable substance I use metallic rods and I do hereby declare that the following is a full and exact description of the construction and operation reference being had to the annexed drawing making a part of this specification.

Figure 1 is a representation of the frame of the bedstead in a horizontal position. Fig. 2 are iron rods running longitudinally between the rails of the bedstead one on each side. Fig. 3 are also two iron rods running transversely between the rails one on each end. Fig. 4 are iron bolts passing through the rail of the bedstead to receive the rods, the bolts being tightened with the nuts on the out side of the rail. Fig. 5 are small iron wires passing longitudinally and transversely between the rods Figs. 2 and 3.

Rods Figs. 2 and 3 are three eighths of an inch in diameter.

The iron wires, Fig. 5 are No. 12 or 13 wire. The wires Fig. 5 pass across to the rods Figs. 2 and 3, longitudinally and transversely at equal distance from each other and are woven together in the same manner as rope cords. This net work is secured to the bed stead by the iron bolts or hooks (Fig. 4). There are ordinarily five of these hooks on each side and three at each end. These are amply sufficient to make the whole strong and permanent and the bed stead to stand firm.

The advantages of this mode of cording bed steads are obvious. The iron wire net work will not sag like rope by stretching. The springing of the wires produces a gentle motion, which is very agreeable and renders the arrangement preferable to all others. It can easily be attached to any bed stead and will hold it firm.

What I claim is—

The combination and arrangement of the rods 2 and 3 with the wires 5 the bolts 4 in the rails 1 substantially as and for the purposes specified.

FRANKLIN RUSSELL.

Witnesses:
BENJAMIN LEWIS,
AMAZIAH D. PARKER.